(12) United States Patent
Salem et al.

(10) Patent No.: US 6,525,444 B2
(45) Date of Patent: Feb. 25, 2003

(54) APPARATUS AND METHOD UTILIZING AMORPHOUS METAL LAMINATES IN AN ELECTRIC GENERATOR

(75) Inventors: Sameh Ramadan Salem, Rexford, NY (US); Ronald Irving Longwell, Ballston Lake, NY (US); Manoj Ramprasad Shah, Latham, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/855,739

(22) Filed: May 16, 2001

(65) Prior Publication Data

US 2002/0171314 A1 Nov. 21, 2002

(51) Int. Cl.[7] .................................... H02K 1/100
(52) U.S. Cl. ............................................ 310/216
(58) Field of Search .......................... 310/216, 217, 310/211

(56) References Cited

U.S. PATENT DOCUMENTS

| | | | | |
|---|---|---|---|---|
| 4,227,109 A | * | 10/1980 | Mulach | 310/258 |
| 4,255,684 A | * | 3/1981 | Mischeler et al. | 310/216 |
| 4,392,073 A | * | 7/1983 | Rosenberry, Jr. | 310/216 |
| 5,903,082 A | | 5/1999 | Caamano | 310/254 |
| 5,986,378 A | | 11/1999 | Caamano | 310/216 |
| 6,420,813 B1 | * | 7/2002 | DeCristofaro et al. | 310/216 |
| 6,462,456 B1 | * | 10/2002 | DeCristofaro et al. | 310/216 |

FOREIGN PATENT DOCUMENTS

| | | |
|---|---|---|
| EP | 0380935 | 1/1990 |
| EP | 0521688 A1 | 6/1992 |

OTHER PUBLICATIONS

Ning Lu et al., "Amorphous Metals for Radial Airgap Electric Machines", ICEM 2000 Aug. 28–30, 2000, Espoo Finland.

* cited by examiner

Primary Examiner—Nestor Ramirez
Assistant Examiner—Nguyen Hanh
(74) Attorney, Agent, or Firm—Nixon & Vanderhye PC

(57) ABSTRACT

A stator core-end of an electric generator utilizes amorphous metal laminate packages to reduce eddy currents and heating in the stator core thereby increasing generator capacity. The packages are formed as complete units before installation into the stator core. The amorphous metal laminate packages comprise alternating layers of amorphous metal laminates and non-amorphous metal laminates.

20 Claims, 6 Drawing Sheets

APPARATUS AND METHOD UTILIZING AMORPHOUS METAL LAMINATES IN AN ELECTRIC GENERATOR

BACKGROUND OF THE INVENTION

This invention relates to electrical generators, and, more particularly, to stator core-end structures for reducing electromagnetic losses and associated heating in generator core-ends by using amorphous metal laminates.

The operating efficiency of electrical generators can be severely impacted by electromagnetic losses in the generator core-ends. More specifically, the axial component of magnetic flux normal to the plane of the generator stator core-end induces eddy currents in the stator core-end laminations. The eddy currents cause power loss and stator core-end region heating thereby limiting generator capacity due to thermal limits imposed by internal design guides and industry standards.

A typically constructed generator is shown in FIG. 1, to comprise stator 12, rotor 14, and armature end winding 36. Outside space block 32, stator flange 28 and key bar 30 maintain metal lamination packages 40 in place. Several ways have been proposed to reduce the electromagnetic flux normal to the stator core-end to minimize the eddy current losses and heating. For example, it has been proposed to increase the air gap 38 length towards the end of the stator core-end to reduce the detrimental effects of the electromagnetic flux. Core-end stepping 34 has also been proposed, as shown in FIG. 1, for eliminating or at least reducing the negative effects of the electromagnetic flux. And finally, it has also been proposed to reduce the relative axial length of the rotor with respect to the stator to minimize the core-end electromagnetic flux.

All of the above described actions, for reducing electromagnetic flux at the stator core-end of an electrical generator, have proven to be somewhat deficient in that in each case the generator requires an increased excitation which contributes to lower machine operating efficiency and a potentially bigger thermal problem.

BRIEF SUMMARY OF THE INVENTION

Amorphous magnetic materials have the distinct advantage of having greatly reduced hysteresis losses. The core loss of amorphous metals, for example, is considerably lower than that of grain-oriented silicon steel. Furthermore, amorphous metal cores are able to respond to changes in a magnetic field much more quickly than conventional ferrous core materials. For all of these reasons, amorphous metals are an attractive substitute for silicon steel laminations, especially in the stator core-end to reduce loss and decrease core-end temperatures.

In an exemplary embodiment of the invention, a stator core-end construction comprises amorphous metal laminates which may be stepped to further reduce core-end losses. This construction has distinct advantages over the prior art in that the reduction of eddy currents and heating of the stator core-end is accomplished without any sacrifice of performance or machine efficiency. As a result, the present invention has application in newly constructed electric generators and for up-rating existing electric generators to achieve higher capacities.

DETAILED DESCRIPTION OF THE INVENTION

Figure 1:
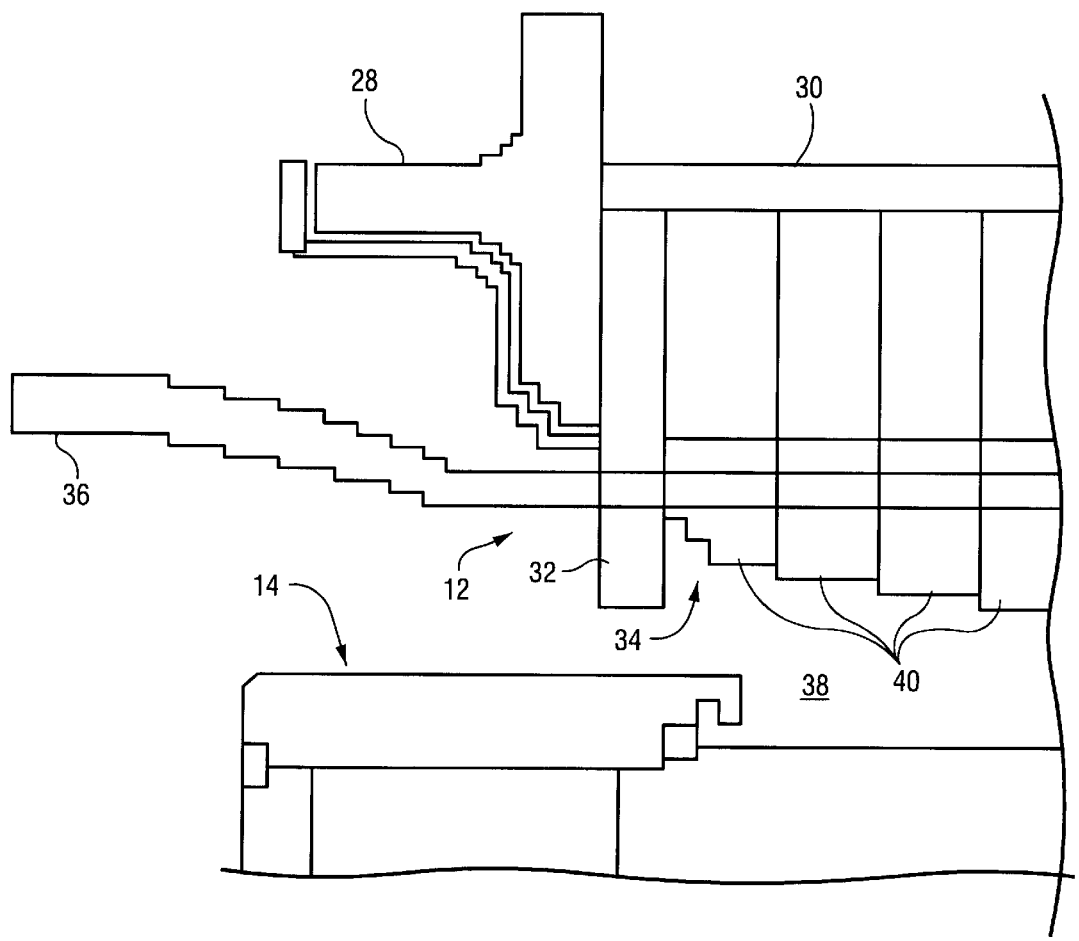
FIG. 1 is a schematic depiction of a prior art generator construction.
Figure 2:
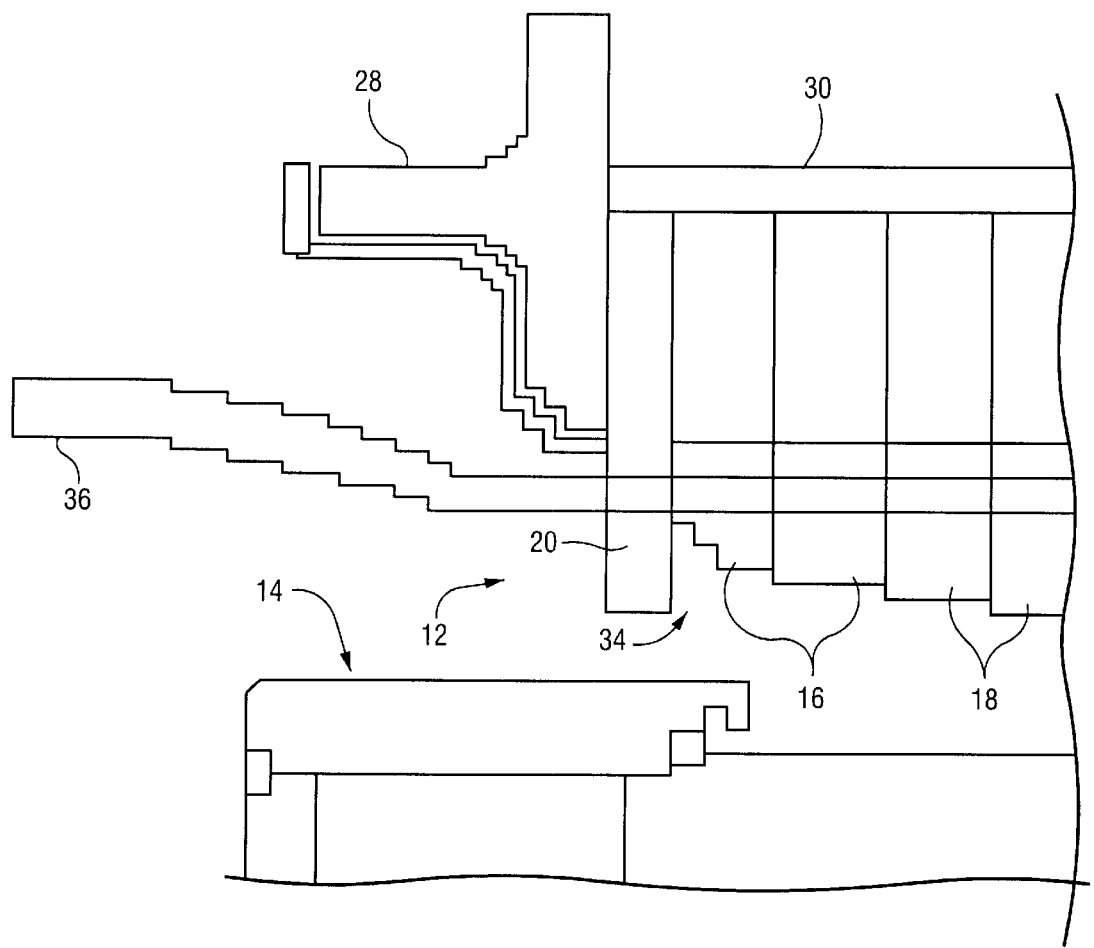
FIG. 2 is a schematic depiction of an exemplary embodiment of the present invention.

As shown in FIG. 2, an electrical generator includes stator 12, rotor 14 and armature end winding 36. Outside space block 20, stator flange 28 and key bar 30 maintain stacked amorphous metal lamination packages 16 and non-amorphous metal lamination packages 18 in place. The core-end of stator 12 comprises a number of stacked amorphous metal lamination packages 16 and non-amorphous metal lamination packages 18. Both the amorphous metal lamination packages 16 and non-amorphous metal lamination packages 18 can utilize core end stepping 34 for minimizing electromagnetic flux. The non-amorphous metal lamination packages 18 can be formed, for example, from silicon steel laminates. Amorphous metal lamination packages 16 are disposed between outside space block 20 and silicon steel lamination packages 18. The construction of amorphous, metal lamination packages 16 will be described in greater detail in accordance with FIG. 3.

Figure 3:
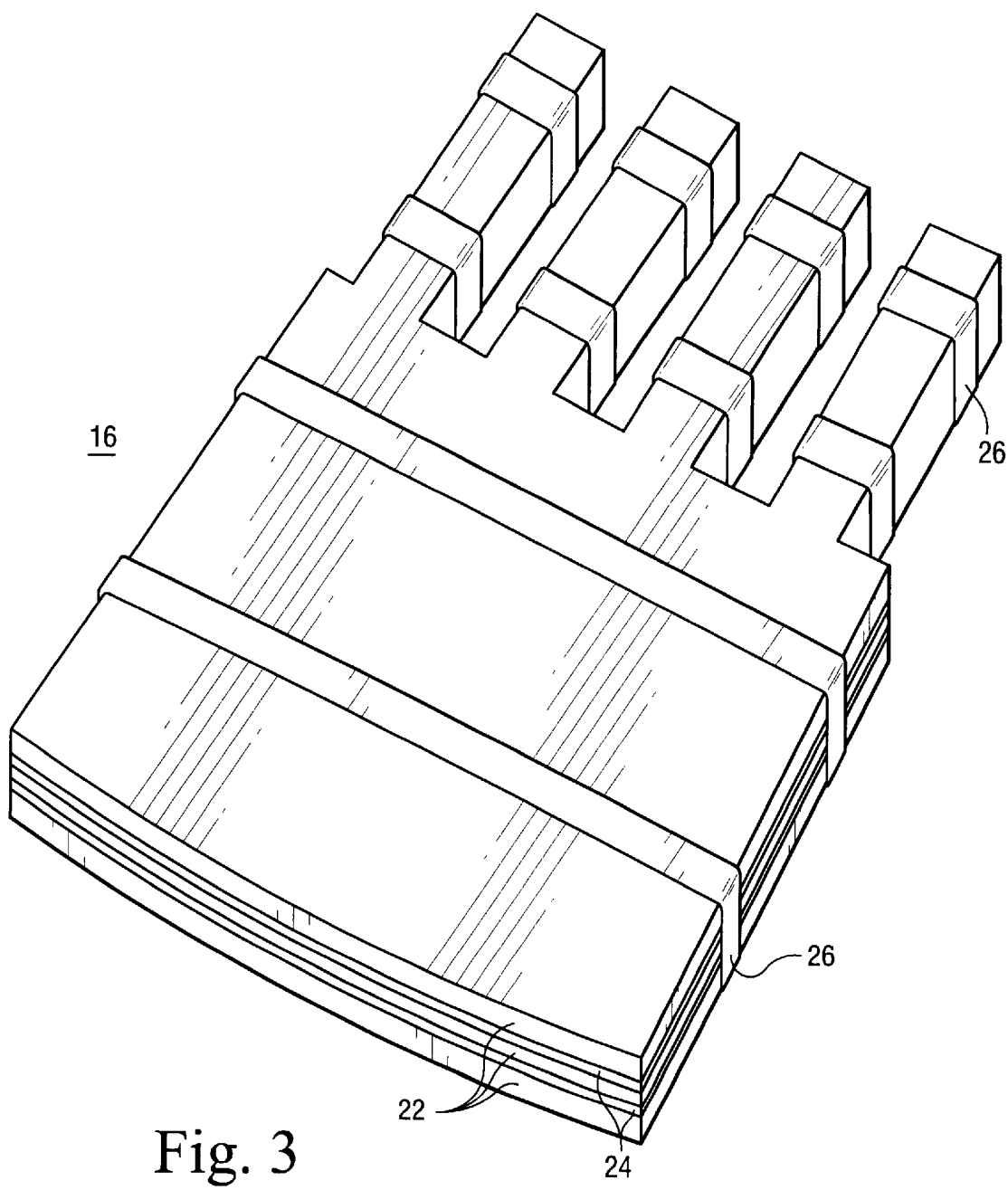
FIG. 3 is a perspective view of an amorphous metal lamination package used in the embodiment shown in FIG. 2.

As shown in FIG. 3, amorphous metal lamination package 16 comprises alternate layers of amorphous metal laminate 22 and non-amorphous metal laminate 24. Non-amorphous metal laminate 24, for example, can comprise silicon steel laminate. The non-amorphous metal layers serve to support the amorphous metal layers. Straps 26 are used as reinforcing ties for the packaged structure.

Figure 4:
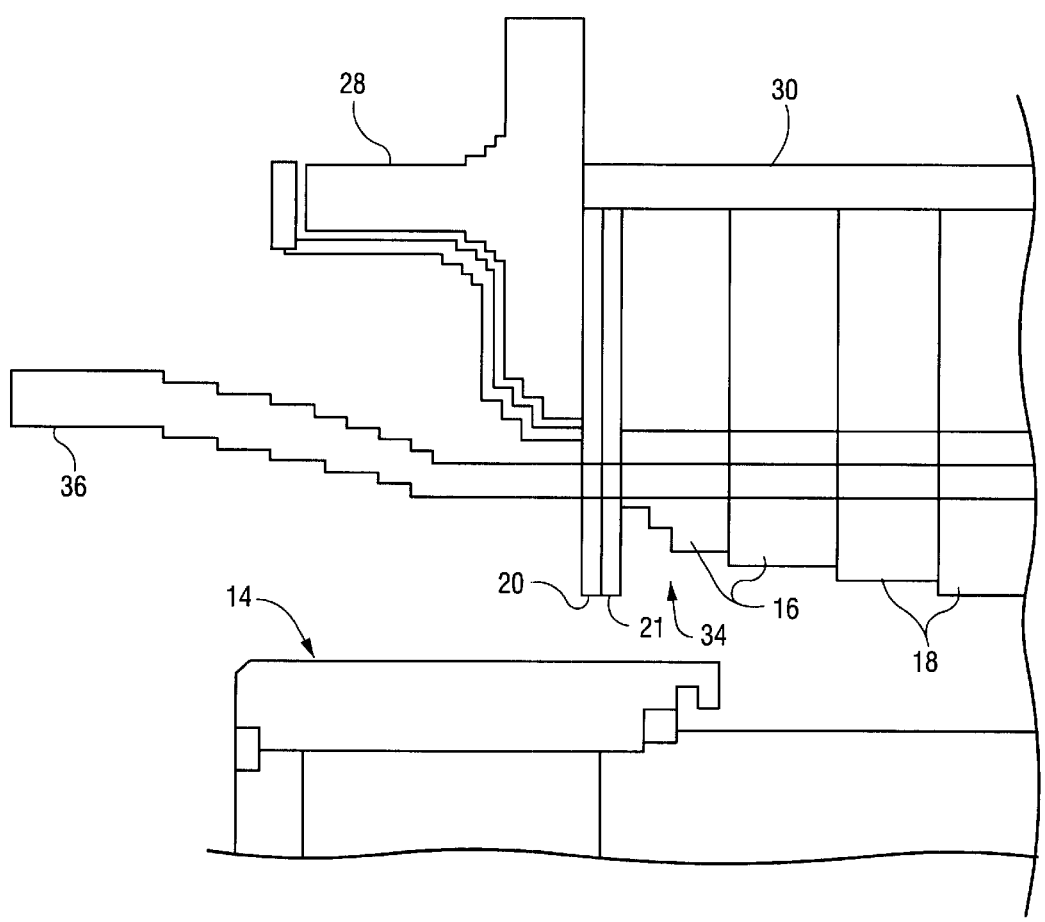
FIG. 4 is a schematic depiction of another embodiment of the present invention.

Another embodiment of the present invention, shown in FIG. 4, includes stainless steel support spacer 21 positioned between outside space block 20 and amorphous metal lamination package 16. Core end stepping 34 may also be used to minimize electromagnetic flux.

Figure 5:
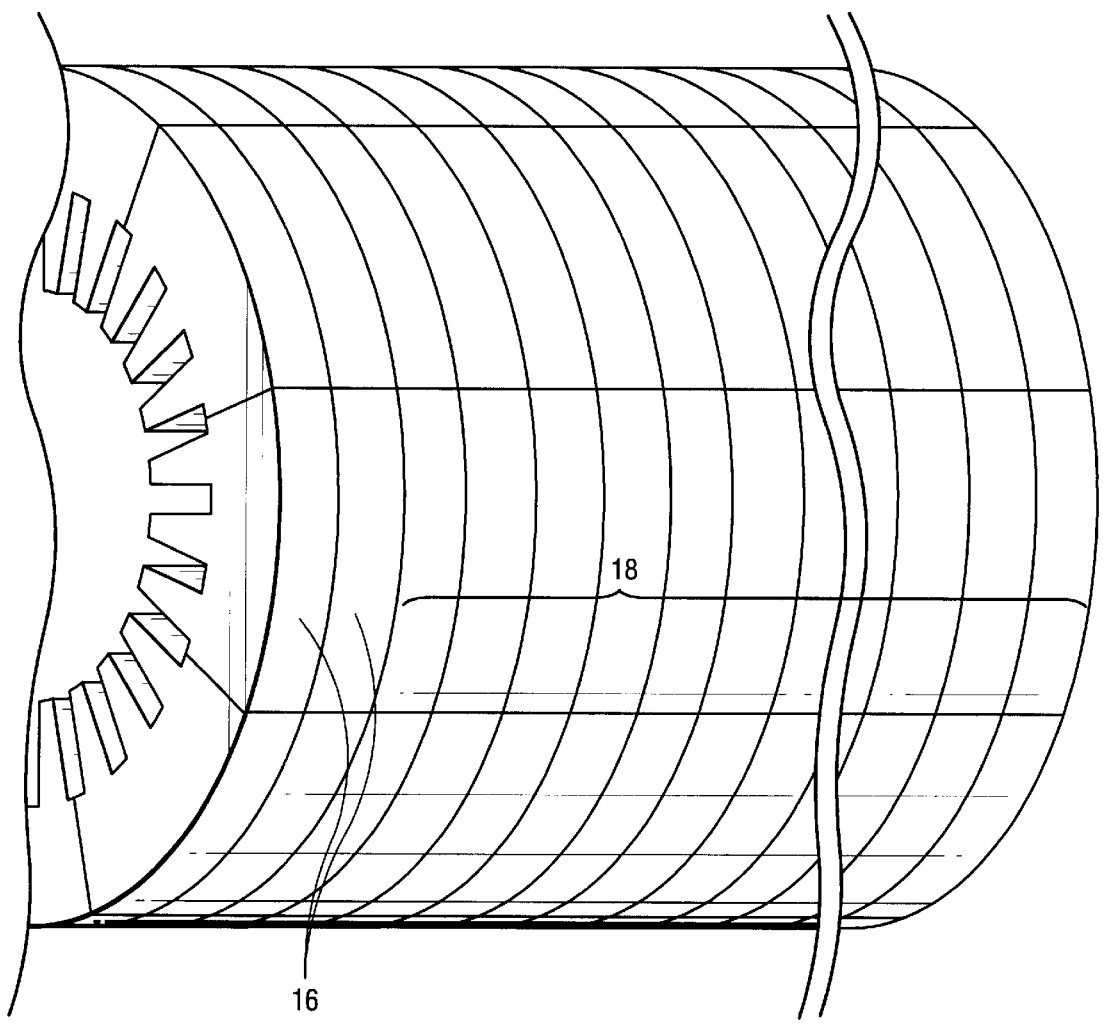
FIG. 5 is a perspective view of a partially assembled stator core.

FIG. 5 is a perspective view of a partially assembled stator core. The stator core is made up amorphous metal laminate packages 16 and non-amorphous metal laminate packages 18. Space blocks, key bars, the stator flange and other details have not been shown to more clearly illustrate the arrangement of the laminate packages.

Figure 6:
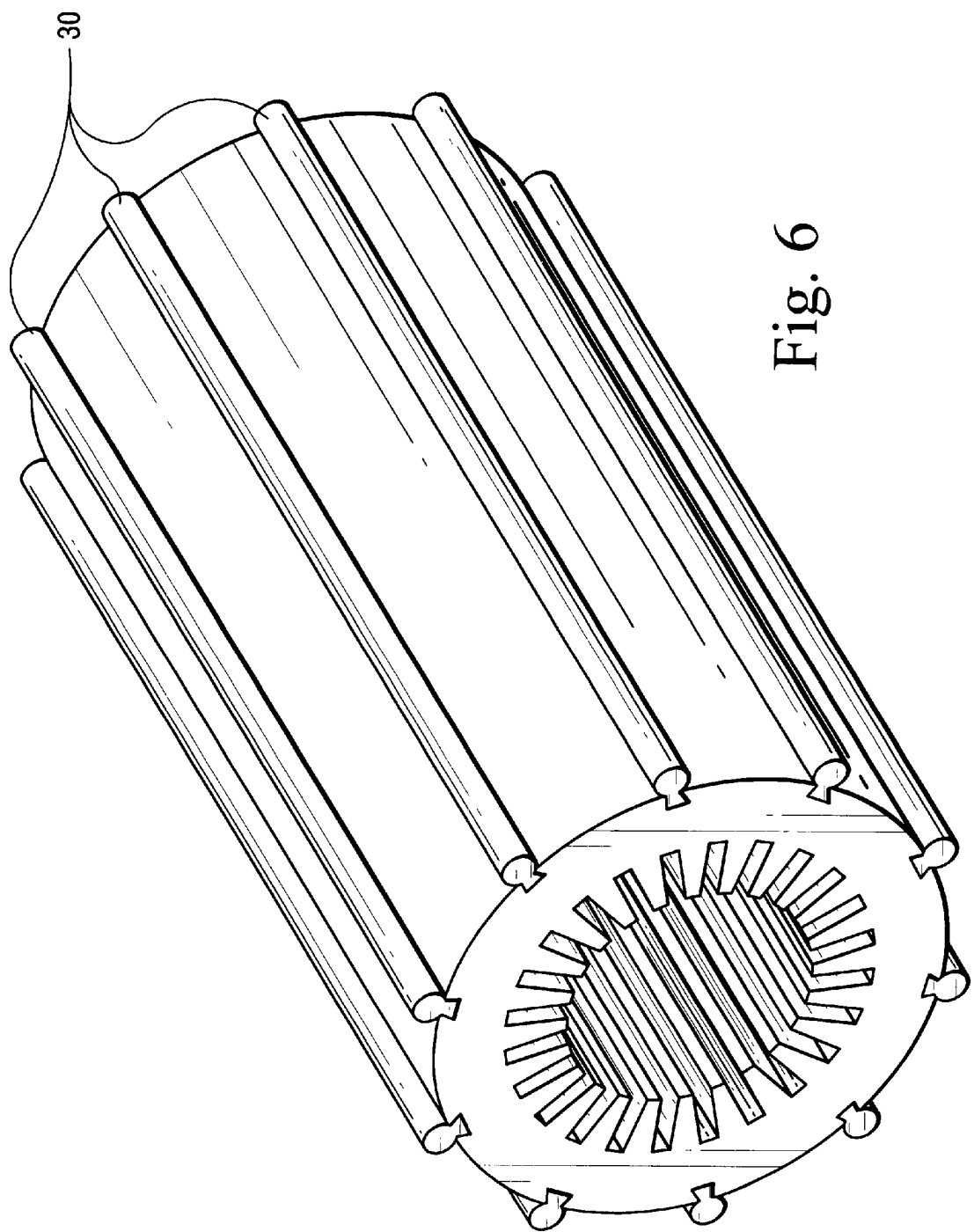
FIG. 6 is a perspective view of a fully assembled stator core.

FIG. 6 is a perspective view of the stator core showing the assembled laminate packages being held in place by key bars 30. Other details of the stator core have been omitted from FIG. 6.

The present invention provides a method and structure for minimizing the stresses on an amorphous metal magnetic core of an electrical generator. The amorphous metal cast sheets are approximately 0.0001 inches thick and the stacking factor is a reasonable 80%. Segmenting the laminates, as shown in FIGS. 3 and 5, may be necessary, as amorphous laminations are only 6 or 7 inches wide. One acceptable metal alloy for this purpose is the Honeywell METGLAS 26055 SA1. This metal alloy has an extremely low core loss of less than 0.2 W/Kg at 60 Hz, 1.4 Telsa, or 30% of the core loss of grade M-2 electrical steel.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A stator of an electric generator, said stator comprising a core wherein a respective core-end is formed from a plurality of metal laminate packages, each of said plurality of metal laminate packages being formed from layers of sheet shaped materials, at least one of said plurality of metal laminate packages including sheets of amorphous metal and sheets of non-amorphous metal.

2. The stator core-end of claim 1, said at least one amorphous metal laminate package comprising at least one layer of amorphous metal laminate and at least one layer of non-amorphous metal laminate.

3. The stator core-end of claim 2, said at least one layer of amorphous metal laminate being segmented.

4. The stator core end of claim 1 wherein each one of said plurality of metal laminate packages are manufactured and assembled as one complete unit before installation into said stator core end.

5. The stator core end of claim 1 wherein said plurality of metal laminate packages includes at least one silicon steel laminate package.

6. The stator core end of claim 2 wherein said plurality of metal laminate packages includes at least one silicon steel laminate package.

7. The stator core end of claim 3 wherein said plurality of metal laminate packages includes at least one silicon steel laminate package.

8. The stator core and of claim 1, said plurality of metal laminate packages being stacked against an outside space block and being fixed in position by a stator flange and a plurality of key bars.

9. The stator core end of claim 8, further comprising a stainless steel support spacer positioned between said outside space block and said plurality of metal laminate packages.

10. The stator core end of claim 1, said plurality of metal laminate packages being in a stepped relationship to each other.

11. A method of manufacturing a stator core-end of an electric generator comprising stacking at least one amorphous metal laminate package and at least one non-amorphous metal laminate package.

12. The method of claim 11, in which said at least one amorphous metal laminate package is formed from at least one layer of amorphous metal laminate and at least one layer of non-amorphous metal laminate.

13. The method of claim 12, in which said at least one layer of non-amorphous metal laminate is formed from silicon steel laminate.

14. The method of claim 11, in which said at least one amorphous metal laminate package and said at least one non-amorphous metal laminate package are stacked in a stepped relationship to each other.

15. An electric generator having a stator and a rotor, said stator comprising a core and a respective core-end of said stator being formed from a plurality of amorphous metal laminate packages arranged in a plane perpendicular to a longitudinal axis of said stator and rotor, each of said plurality of amorphous metal laminate packages being formed from layers of sheet shaped material including sheets of amorphous metal and sheets of non-amorphous metal.

16. The generator of claim 15, each one of said plurality of amorphous metal laminate packages comprising at least one layer of amorphous metal laminate and at least one layer of non-amorphous metal laminate.

17. The generator of claim 1 wherein each one of said plurality of amorphous metal laminate packages are manufactured and assembled as one complete unit before installation into said stator core-end.

18. A method of manufacturing a stator of an electric generator, said stator comprising a core wherein a respective core-end is formed by stacking at least one amorphous metal laminate package and at least one non-amorphous metal laminate package perpendicular to a longitudinal axis of said stator and rotor, each of said at least one amorphous metal laminate package and at least one non-amorphous metal laminate package being formed from layers of sheet shaped material, wherein said at least one amorphous metal laminate package includes sheets of amorphous metal and sheets of non-amorphous metal.

19. The method of claim 18, in which said at least one amorphous metal laminate package is formed from at least one layer of amorphous metal laminate and at least one layer of non-amorphous metal laminate.

20. The method of claim 18, in which said at least one amorphous metal laminate package and said at least one non-amorphous metal laminate package are stacked in a stepped relationship to each other.

* * * * *